Jan. 24, 1933.　　　　C. E. PINK　　　　1,895,344

WOVEN WIRE CONVEYER BELT

Filed Feb. 20, 1932

Clarence E. Pink
INVENTOR

BY Victor J. Evans & Co.
ATTORNEYS

Patented Jan. 24, 1933

1,895,344

UNITED STATES PATENT OFFICE

CLARENCE E. PINK, OF CAMBRIDGE, MARYLAND

WOVEN WIRE CONVEYER BELT

Application filed February 20, 1932. Serial No. 594,361.

This invention relates to woven wire conveyer belts and has for the primary object, the provision of a pair of belt structures built into a single belt which will retain its original width by being prevented from stretching or elongating, and will not become distorted when subjected to excessive operating strains and loads.

Another object of this invention is the provision of a construction wherein one of the belt structures includes transverse reinforcing bars which also constitute mediums on which the coiled wires of the other belt structure may hinge and prevent said coiled wires from hinging on each other and said bars are connected to each other whereby tear resisting selvages are provided at the side edges of the belt.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary plan view illustrating a woven wire conveyer belt constructed in accordance with my invention.

Figure 1:
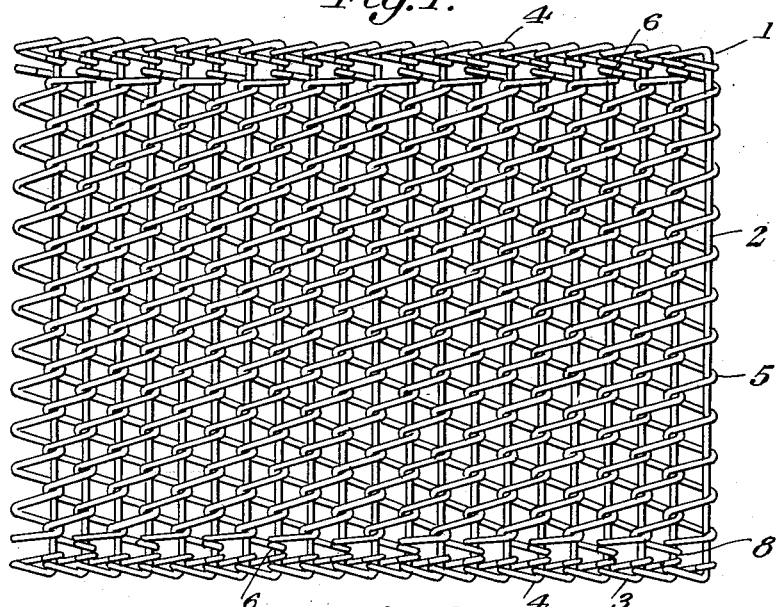

Referring in detail to the drawing, the numeral 1 indicates a fragmentary portion of a woven wire belt especially adapted for conveying excessive loads from one place to another and is constructed to withstand internal load and operating strains and will not stretch or elongate as to width or length, thereby maintaining its original shape and size under all conditions. The belt 1 also is capable of efficient flexation so as to readily conform to the contour of the supporting and driving drums or pulleys.

The belt 1 comprises a pair of belt structures, one built within the other and one of the belt structures includes relatively spaced and transversely arranged bars 2. Each bar 2 has its end portions bent at rightangles to form loops or eyes 3 and the latter of each bar passes about or encircles the adjacent bar thereto so that the bars throughout the belt will be hinged one to the other and form selvages 4 to the side edges of the belt capable of resisting excessive wear and strains having a tendency to tear or separate the belt. The bars 2 thus connected form one of the belt structures.

The other belt structure consists of a plurality of spirally formed or coiled wires 5 interwoven with each other and also woven with the bars, with the latter extending through the coils of the wires. The wires 5 being interwoven with each other, one hinges relative to the other and are prevented from having hinging movement of each other by the bars. Each wire has two bars extending through the coils thereof so that the wires of the belt when flexing relative to each other hinge on the bars. The ends of the wires are looped about every other bar as shown at 6 thereby effectively connecting the wires of one belt structure to the bars of the other belt structure and which will not affect the flexation of either of the belt structures. The ends of the wires are thus anchored in place and arranged inwardly of the selvages 4 and are protected from injury or becoming torn.

Figure 3:
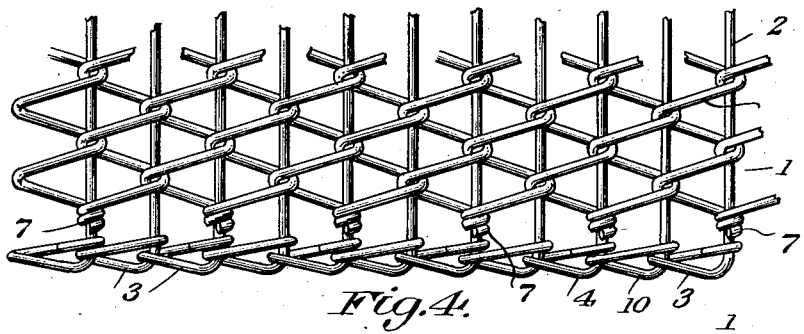
Figure 3 is a fragmentary plan view illustrating a modified means of connecting the coiled wires of one of the belt structures to the transverse reinforcing and hinging means of the other belt structure.

As shown in Figure 3 the ends of the wires 5 may be twisted or coiled several times about the respective bars as shown at 7 or they may be simply looped about their respective bars as shown at 8 in Figure 1.

Figure 2:
Figure 2 is a fragmentary edge elevation illustrating the same.
Figure 5:
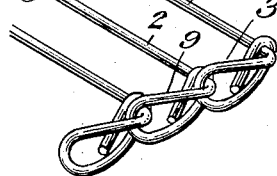
Figure 5 is a fragmentary perspective view illustrating the connecting of the bars as shown in Figure 2.

As shown in Figures 2 and 5 the end portions of each bar 2 when forming the loops 3 are first bent upwardly, then downwardly and back upon themselves and about the respective bar with the ends thereof terminating adjacent the lower runs of the loops. The end portions of each bar 2 when bent to form the loops 3 extend about the adjacent bar inwardly of its loop portions 3 and outwardly of the free end portions 9, whereby the bars will be prevented from shifting endwise relative to each other or transversely of the belt 1, but still have free hinging movement relative to each other.

Figure 4:
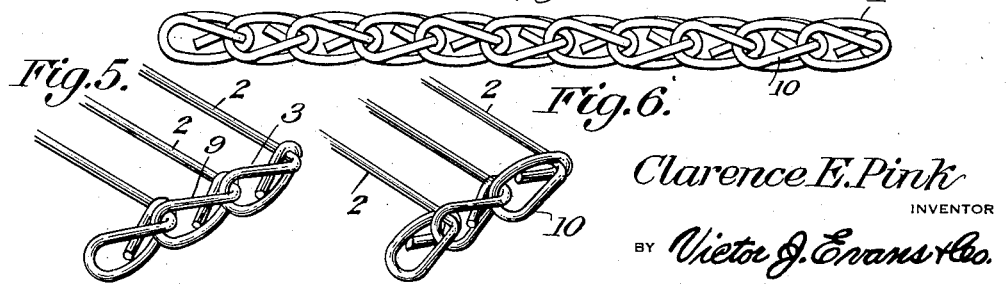
Figure 4 is a fragmentary edge elevation illustrating a modified form of connecting the ends of the bars of one of the belt structures.
Figure 6:
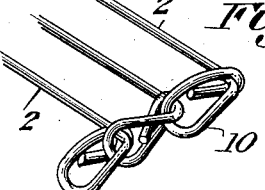
Figure 6 is a similar view illustrating the connecting of the ends of the bars as shown in Figure 4.

As shown in Figures 4 and 6, the loop portions of the bars are formed in a slightly different manner from that shown in Figures 2 and 5. The loop portions of every other bar are bent downwardly, upwardly and back upon themselves and about the respective bars as shown at 10, while the bars therebetween are bent in the same direction as shown in Figures 2 and 5 or in other words are bent upwardly, downwardly and back upon themselves and about the respective bars, thus the looped portions of one group of bars are reversely bent to the looped portions of the other group of bars.

From the foregoing description taken in connection with the accompanying drawing, it will be apparent that a conveyer belt has been provided capable of withstanding severe internal strains and also capable of withstanding excessive load and operating strains and further any tears or broken portions which may develop within the belt will be prevented from spreading or extending throughout the belt and also the belt will be maintained in its original shape and size by being prevented from stretching or elongating when subjected to excessive loads or operating strains.

While I have shown and described the preferred embodiment of my invention, it will be understood that minor changes in construction, combination and arrangement of parts may be made without departing from the spirit and scope of my invention, as claimed.

Having thus described my invention, what I claim is:

A woven wire conveyer belt comprising a plurality of relatively spaced bars, each of said bars having each end bent to form a pair of loops extending at right angles thereto, one loop of each pair extending about its respective bar and the other loop extending about the bar adjacent to said respective bar for hingedly connecting the bars and forming a selvage at each end of the bars, the ends of the bars after forming the loops terminate inwardly of the selvages, and a plurality of coiled and interwoven wires having the bars extending therethrough and cooperating therewith in forming a flexible belt, the ends of said coiled wires being secured to every other bar.

In testimony whereof I affix my signature.

CLARENCE E. PINK.